United States Patent
Walenta et al.

[11] Patent Number: 5,934,244
[45] Date of Patent: Aug. 10, 1999

[54] COMBUSTION PRECHAMBER

[75] Inventors: Manfred Walenta, Gablingen; Kai Rieck, Augsburg, both of Germany

[73] Assignee: Man B&W Diesel Aktiengesellschaft, Augsburg, Germany

[21] Appl. No.: 09/016,658

[22] Filed: Jan. 30, 1998

[30] Foreign Application Priority Data

Jan. 30, 1997 [DE] Germany .......................... 197 03 309

[51] Int. Cl.[6] .................................................. F02B 19/00
[52] U.S. Cl. ........................... 123/261; 123/268; 123/273
[58] Field of Search ................................... 123/261, 268, 123/273, 275

[56] References Cited

U.S. PATENT DOCUMENTS 4,106,444  8/1978  Deutschmann et al. ............. 123/193.5
4,416,228 11/1983  Benedikt et al. ....................... 123/268
4,608,321  8/1986  Sato et al. ............................ 123/193.1
5,293,851  3/1994  Schaub ................................. 123/259

Primary Examiner—Erick R. Solis
Attorney, Agent, or Firm—Cohen, Pontani, Lieberman & Pavane

[57] ABSTRACT

A combustion prechamber is formed by at least two components. An upper component for accommodating an injection device, for example, and a lower component for sealing the prechamber off from the main combustion chamber. To configure such a combustion pre-chamber such that, without impairing the combustion process and the service life, instead of being welded, the connecting seam between the upper component and the lower component is notch-free and, at the same time, has a high strength, and is produced by a brazing process.

4 Claims, 1 Drawing Sheet

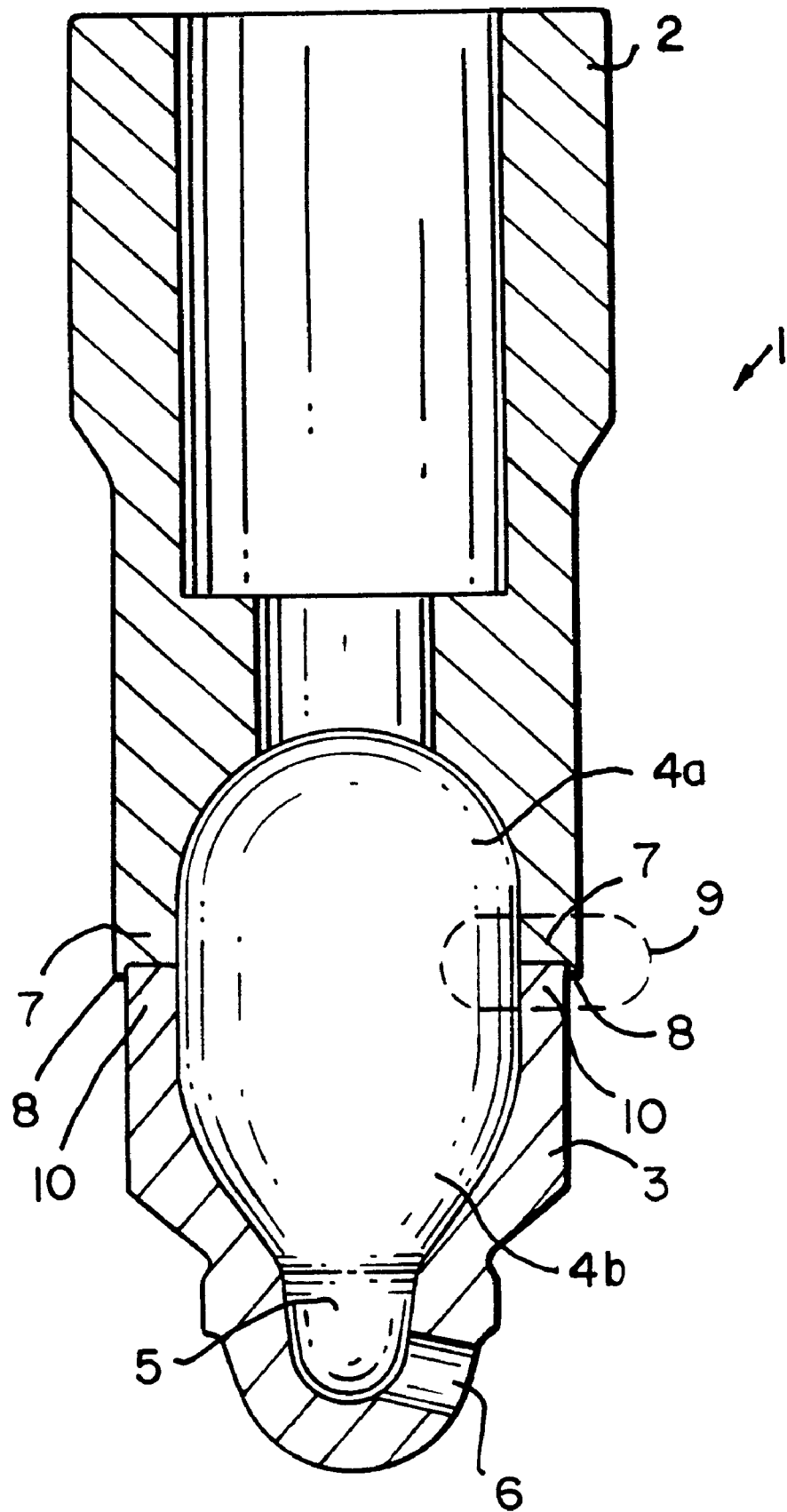

COMBUSTION PRECHAMBER

BACKGROUND OF THE INVENTION

1. Field of the Invention

The present invention relates to a combustion prechamber for a spark-ignition or diesel engine, which is formed by at least two components, an upper component including, for example, an injection or ignition device, and a lower component which seals the prechamber off from a main combustion chamber of a cylinder of the engine.

2. Description of the Related Art

For production reasons, combustion prechambers are generally designed in several parts. More particularly, production costs for combustion prechambers made of several parts are substantially reduced compared with prechambers that are produced in one piece from a single material, without impairing the combustion process or the service life of the combustion prechamber. This is because the thermally most severely stressed part comprises a high-value material, while the other part or parts can be produced from a cheaper material.

Prior art prechambers having more than one part are known in which the individual components which form the prechamber are welded together, forming a parting line. A combustion pre-chamber of this type is disclosed, for example, in German reference DE 1 065 215.

Various welding processes have already been used for the purpose of joining such components. Examples of known welding processes for joining such components include tungsten inert-gas welding (TIG), metal inert-gas welding (MIG), metal active-gas welding (MAG) and beam welding using a laser or electron beam.

However, these joining processes are complicated and expensive. In addition, a welded joint is not notch-free. Above all, a non-welded butt point remains on the inner wall which forms the pre-chamber, with the result that there is a risk of incipient cracks at this point.

SUMMARY OF THE INVENTION

It is an object of the present invention to configure a combustion prechamber having at least two components in such a way that, without impairing, the combustion process and the service life, a simple and cost-effective production is possible in comparison with a welded joint, and in which the connecting seam of the at least two individual components is notch-free and has high strength.

According to the invention, the object is achieved in a prechamber having more than one component when the connecting seam between the prechamber components is produced by a brazing process. This measure, on the one hand, enables the connection of components made of the same or different materials and, on the other hand, gives a high connection strength. Furthermore, a notch-free connecting seam is realized.

In particular, high-temperature brazing provides a very heat-resistant connection. High-temperature brazing is a thermal joining and coating process in a vacuum or in an atmosphere of inert gas, using brazing metals whose melting temperatures lie above 900° C. The metals that are most often used in brazing are nickel-based brazing metals, gold/nickel and other noble metal brazing metals, as well as copper and copper-based brazing metals.

Hard soldering would also provide a beat-resistant connection. The hard solders used in this case are preferably alloys of copper and zinc (brass solders) and, for lightweight metals, an aluminum/silicon alloy, zinc/tin alloy or zinc/aluminum/cadmium alloy.

The selection of materials for the pre-chamber components depends on the thermal loading of the pre-chamber. The thermal expansion of the joint partners should be approximately the same.

The configuration of the butt points of the pre-chamber components to be connected is carried out in accordance with specific rules, and thus ensures optimal flow of the brazing metal, and hence the best possible wetting of the interfaces and the best possible strength of the connecting seam.

It is to be seen as a particularly advantageous measure to provide one of the components, in particular the less thermally loaded upper component of the pre-chamber, at its butt point with an annular collar for external centering at the butt point of the other component, in particular of the lower, thermally more highly loaded component, to reduce the thermal stresses acting on the brazed seam and hence to increase the component strength.

Taking all these measures into account, high-temperature vacuum brazing has proven to be the most advantageous joining process.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention is described below using the example of a combustion pre-chamber illustrated in the drawing.

FIG. 1 is a sectional view along a longitudinal centerline of a combustion prechamber of the present invention.

DETAILED DESCRIPTION OF THE PRESENTLY PREFERRED EMBODIMENTS

A combustion pre-chamber 1, comprises an upper component 2 and a lower component 3. The upper component 2 accommodates a device (not shown), which may be, for example, a fuel oil injection system. The lower component 3 seals the prechamber off from the main combustion chamber of a cylinder (not shown). Each one of the upper component 2 and the lower component 3 comprises a half-chamber 4a, 4b. The lower component 3, which projects into the main combustion chamber, further encloses a duct-like chamber 5 that adjoins the half-chamber 4b. The connection between the duct-like chamber 5 and the main combustion chamber comprises one or more bores 6 made at a specific angle to the axis of the pre-chamber 1.

At its butt point 7, the upper component 2 comprises an annular collar 8 located on the outer perimeter, and is centered by the annular collar 8 on a butt point 10 of the lower component 3. The upper portion 2 is connected to the lower portion 3 at the butt points 7, 10 by a connecting seam 9 formed by a brazing process.

In particular, the preferred embodiment uses a high-temperature brazing using brazing metals such as nickel-based brazing metals, gold/nickel and other noble metal brazing metals, as well as copper and copper-based brazing metals to form the connecting seam 9.

In another embodiment, hard soldering of the upper component 2 to the lower component 3 is used. The hard solders used in this case to form the connecting seam 9 are preferably alloys of copper and zinc (brass solders) and, for lightweight metals, an aluminum/silicon alloy, zinc/tin alloy or zinc/aluminum/cadmium alloy.

The selection of materials for the pre-chamber upper and lower components 2, 3 depends on the thermal loading of the prechamber. In the preferred embodiment, the thermal expansion of the joint partners is the same.

The configuration of the butt points of the pre-chamber components to be connected is carried out in accordance with specific rules, and thus ensures optimal flow of the brazing metal, and hence the best possible wetting of the interfaces and the best possible strength of the connecting seam.

The combustion pre-chamber 1 configured in this way can be used in a known manner in the cylinder head of an internal combustion engine, as is disclosed, for example, in DE-A 27 53 266. It is also possible to use this combustion pre-chamber 1 in the same way for a dual-fuel engine, which can be operated optionally using natural gas instead of diesel oil fuel and, for example, operates in accordance with the so-called low-pressure gas-injection process. In this process, the combustible gas is introduced into the cylinder during the inlet cycle, compressed together with the combustion air, and ignited with the injection of a small amount of diesel oil or heavy oil into the combustion pre-chamber.

The invention is not limited by the embodiments described above which are presented as examples only but can be modified in various ways within the scope of protection defined by the appended patent claims.

We claim:

1. A combustion prechamber for an engine, comprising:
   an upper component having a lower end and bearing a first thermal load;
   a lower component having an upper end and bearing a second thermal load greater than said first thermal load;
   said upper end of said lower component operatively connected to said lower end of said upper component for separating said combustion prechamber from a cylinder of said engine;
   a connecting seam between said lower end of said upper component and said upper end of said lower component formed by a brazing process; and
   all annular collar on said lower end of said upper component receiving said upper end of said lower component and operatively arranged for centering said lower component with respect to said upper component and for reducing thermal stress on said connecting seam.

2. The combustion prechamber of claim 1, wherein the connecting seam is formed by high-temperature brazing.

3. The combustion prechamber of claim 2, wherein the connecting seam is formed by high-temperature brazing in a vacuum and comprises a nickel-based brazing metal.

4. The combustion prechamber of claim 1, wherein said connecting seam comprises a brazing metal and contacts an upper butt point of said upper component and a lower butt point of said lower component, wherein said upper butt point and said lower butt point are operatively configured for optimal flow of the brazing metal, optimal wetting of interfaces of the upper butt point and the lower butt point, and optimal strength of the connecting seam.

* * * * *